United States Patent [19]
Honeck et al.

[11] Patent Number: 6,044,315
[45] Date of Patent: Mar. 28, 2000

[54] VEHICLE NON-VOLATILE MEMORY SYSTEM

[75] Inventors: Brian S. Honeck, Holland; Colin R. Smidstra, Hudsonville, both of Mich.

[73] Assignee: Prince Corporation, Holland, Mich.

[*] Notice: Under 35 U.S.C. 154(b), the term of this patent shall be extended for 164 days.

[21] Appl. No.: 08/661,303

[22] Filed: Jun. 13, 1996

[51] Int. Cl.⁷ ........................................................ G06F 7/00
[52] U.S. Cl. ................................ 701/35; 701/115; 702/92; 702/149; 33/356; 33/361; 340/459; 340/438
[58] Field of Search .................................. 701/35, 29, 93, 701/96, 30, 102, 115; 364/561, 565, 566; 340/436, 438, 459; 702/92, 150, 142, 86, 95, 149; 708/203; 33/356, 361; 324/245, 247, 258, 166

[56] References Cited

U.S. PATENT DOCUMENTS

| | | | |
|---|---|---|---|
| 4,546,551 | 10/1985 | Franks | 364/559 |
| 4,570,228 | 2/1986 | Ahlberg | 364/467 |
| 4,692,882 | 9/1987 | Skovgaard et al. | 364/565 |
| 4,853,859 | 8/1989 | Morita et al. | 364/424.04 |
| 4,858,133 | 8/1989 | Takeuchi et al. | 364/424.04 |
| 4,858,135 | 8/1989 | Clish et al. | 701/35 |
| 4,866,616 | 9/1989 | Takeuchi et al. | 364/424.04 |
| 5,090,231 | 2/1992 | Gallagher | 364/571.05 |
| 5,161,311 | 11/1992 | Esmer et al. | 324/247 |
| 5,187,872 | 2/1993 | Dufour | 364/571.04 |
| 5,239,470 | 8/1993 | Komatsu | 364/424.04 |
| 5,305,214 | 4/1994 | Komatsu | 364/424.04 |
| 5,379,219 | 1/1995 | Ishibashi | 364/424.04 |
| 5,390,122 | 2/1995 | Michaels et al. | 364/443 |

Primary Examiner—Jacques H. Louis-Jacques
Attorney, Agent, or Firm—Price, Heneveld, Cooper, DeWitt & Litton

[57] ABSTRACT

An electronic vehicle accessory includes a non-volatile memory, and a controller coupled to the non-volatile memory and to a speed sensor of the vehicle for receiving speed data representing the vehicle's current speed. The controller determines when the vehicle's current speed falls below a predetermined threshold and stores variable data in the non-volatile memory when the vehicle's speed is below the predetermined threshold. The electronic vehicle accessory may be an instrument panel, an electronic compass, and/or a mini-trip computer, which may be housed in an overhead housing. By storing variable data in the non-volatile memory as a function of the vehicle's speed, the present invention ensures that the most up-to-date data is stored in the non-volatile memory before the vehicle's ignition is turned off while eliminating excessive stores that shorten the lifetime of the non-volatile memory. Further, by storing data as a function of vehicle speed, the connection to a battery powerline may be eliminated and the manufacturing and installation costs may be significantly reduced. Additionally, excessive battery drain resulting from the electronic accessory being locked in a failure mode may be prevented.

39 Claims, 5 Drawing Sheets

6,044,315

VEHICLE NON-VOLATILE MEMORY SYSTEM

BACKGROUND OF THE INVENTION

The present invention relates to a non-volatile memory system for use in a vehicle and specifically to an electronic system having improved storing procedures for storing data to a non-volatile memory.

As the use of electronics in vehicles increases, so does the need for and use of non-volatile memories in such systems. Non-volatile memories are currently used in vehicle electronic systems for storing program instructions for various microcontroller processes, as well as variable data that must be stored in a non-volatile memory to avoid losing the data each time the vehicle's ignition is turned off. For example, such data may include the odometer data of an electronic odometer, the mileage travelled since a last reset of the trip distance meter, compass calibration data, data representing the temperature sensed at the time the ignition was last turned off, data representing the lapsed time from the last timer reset as of the time the ignition is last turned off, and any other data that is advantageously stored in memory for recall after the ignition is turned on again.

In order to store data in a non-volatile memory with the ignition off, the power supply modules for the electronic systems utilizing non-volatile memories must have connections to both the vehicle's ignition power supply line and to the vehicle's battery. Providing two powerline connections to a component in a vehicle increases the cost of including such an electronic accessory in the vehicle. Further, when the electronic accessory is placed in a location in the vehicle that is further away from the instrument panel, a connection to both the ignition and the battery may not be possible without increasing the installation cost of the accessory to a level that makes it impractical to add the accessory in the vehicle. Additionally, each power supply line typically requires transient protection circuitry to isolate the electronic component from any input noise on the powerline and from radiated output emissions. Further, a switch-over circuit must be included in the accessory power supply to switch the power supply from one line to another. All of these added components associated with the inclusion of two different power supply lines significantly increases the production costs for the electronic accessory. In the automotive environment where vehicles are mass-produced, the added costs associated with providing two powerlines to a single electronic accessory can be significant.

Non-volatile memories of the type used in vehicles have typically had a limited number of data stores per lifetime. A typical number of stores per lifetime for a non-volatile memory had been 10,000 stores. Thus, it has been necessary to limit the number of data stores that are made to a vehicle's non-volatile memory to ensure that the non-volatile memory would be functional throughout the lifetime of the vehicle. Because of these limitations, vehicle electronic systems have typically only stored data in the non-volatile memory upon the detection of the turning off of the vehicle's ignition.

Another problem associated with vehicle electronic accessories that require a connection to the battery power supply line is that the electronic accessory could get locked in a failure mode and, if the electronic accessory utilizes significant amounts of power, a vehicle's battery could become completely drained.

SUMMARY OF THE INVENTION

It is therefore an object of the present invention to provide an improved non-volatile memory system that overcomes the above-noted problems. One aspect of the present invention is to provide a non-volatile memory system that does not require a connection to the vehicle's battery. Still another aspect of the present invention is to provide a non-volatile memory system that operates more effectively while reducing the cost of manufacturing and installing the electronic accessory in which it is implemented. Yet another feature of the present invention is to provide a non-volatile memory system that eliminates the possibility that the electronic accessory could get locked in a failure mode and drain the vehicle's battery.

To achieve these and other advantages, and in accordance with the purpose of the invention as embodied and described herein, the electronic vehicle accessory includes a non-volatile memory, and a controller coupled to the non-volatile memory and to a speed sensor of the vehicle for receiving speed data representing the vehicle's current speed. The controller determines when the vehicle's current speed falls below a predetermined threshold and stores variable data in the non-volatile memory when the vehicle's speed is below the predetermined threshold. The electronic vehicle accessory of the present invention may be an instrument panel, an electronic compass, and/or a mini-trip computer, which may be housed in an overhead housing. By storing variable data in the non-volatile memory as a function of the vehicle's speed, the present invention ensures that the most up-to-date data is stored in the non-volatile memory before the vehicle's ignition is turned off while eliminating excessive stores that shorten the lifetime of the non-volatile memory. Further, by storing data as a function of vehicle speed, the connection to a battery powerline may be eliminated and the manufacturing and installation costs may be significantly reduced. In addition, excessive battery drain resulting from the electronic accessory being locked in a failure mode may be prevented.

These and other features, objects, and benefits of the invention will be recognized by those who practice the invention and by those skilled in the art, from reading the following specification and claims together with reference to the accompanying drawing figures.

DETAILED DESCRIPTION OF PREFERRED EMBODIMENT

Figure 1:
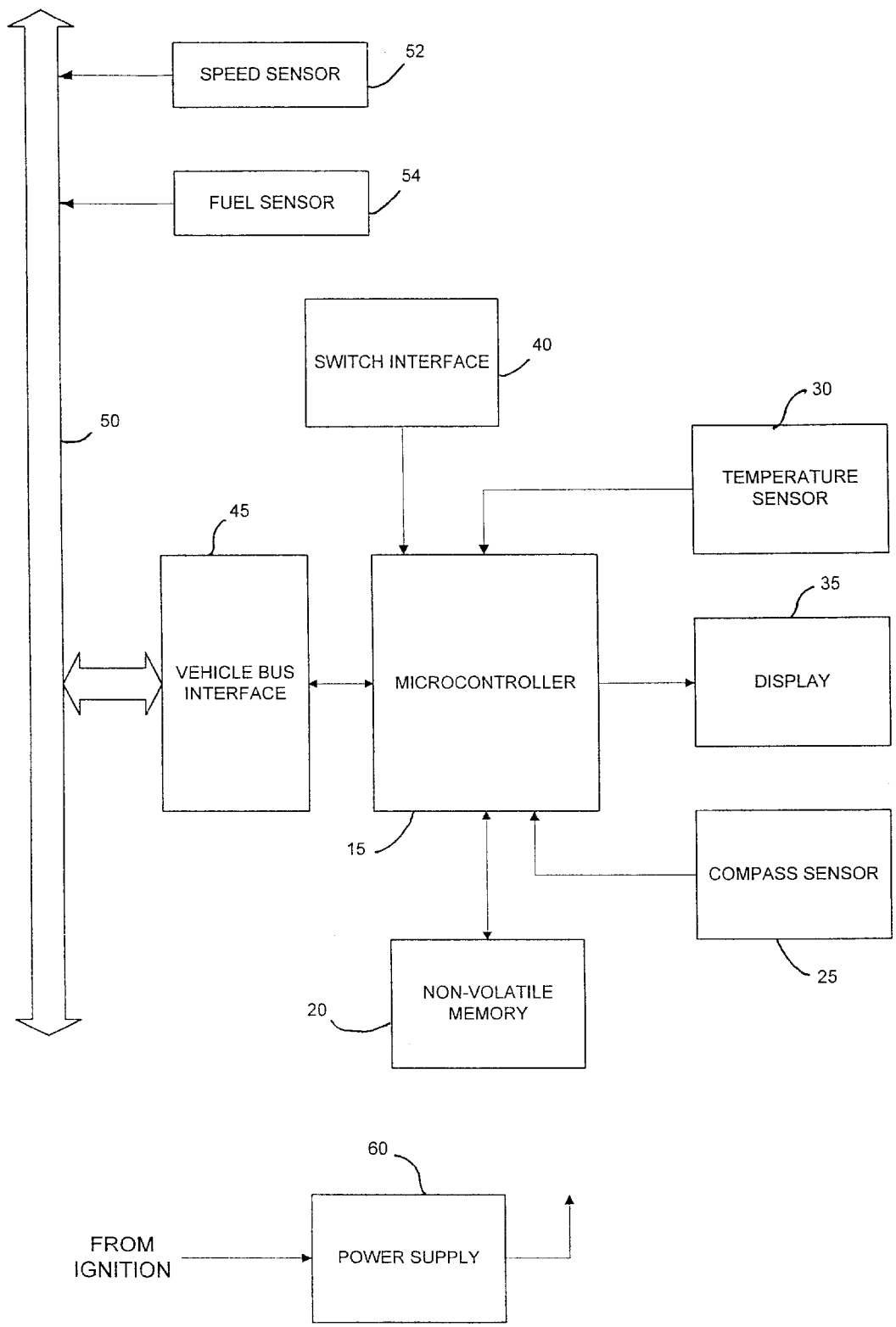
FIG. 1 is an electrical circuit diagram in block form of an electronic system for use in a vehicle, and incorporating the present invention.

FIG. 1 shows an example of a vehicle electronic system utilizing a non-volatile memory, in which the present invention may be implemented. The exemplary electronic system shown in FIG. 1 is preferably the type mounted in an overhead console 212 of a vehicle 10 (FIG. 3) such as an automobile. Console 212 includes a display 35 which may display the vehicle's heading and outside ambient temperature and which may also display various trip information such as elapsed time, trip distance, distance to empty, current fuel economy (miles per gallon), average fuel economy for a trip, as well as other information that would be useful to the vehicle occupants. It will be understood by those skilled in the art, that the circuit shown in FIG. 1 is shown and described for purposes of example only and that the present invention could be implemented in other various electronic accessories utilizing a non-volatile memory, such as an electronic instrument panel.

The electronic system shown in FIG. 1 preferably includes a microcontroller 15 and a non-volatile memory 20 connected to microcontroller 15 by an address and data line or included in the microcontroller chip for storing microcontroller instructions and other variable data. Additionally, the system may include a compass sensor 25 coupled to an input port of microcontroller 15, a display 35 including a display driver coupled to an output port of microcontroller 15, a temperature sensor 30 coupled to an input port of microcontroller 15, and a switch interface 40 providing a connection from various user-actuated switches to an input port of microcontroller 15. An example of a suitable compass sensor, temperature sensor, and compass circuit is disclosed in U.S. Pat. No. 4,953,305, the disclosure of which is incorporated herein by reference.

The system may also include a vehicle bus interface chip 45 providing a connection to the vehicle's bus 50. Also, the electronic system includes a power supply module 60 that is connected to the vehicle's ignition powerline and supplies power to the various components of the electronic system while filtering transients from the ignition powerline and protecting the electronic system from such transients to isolate the system from any input noise and to eliminate radiated output emissions. As is apparent in FIG. 1, the power supply module 60 is not connected to a battery power supply line. Thus, the power supply module does not require additional transient protection circuitry associated with the battery powerline and does not require a switch-over circuit. As will be described in detail below, the present invention utilizes a different storing procedure for storing data to the non-volatile memory 20 prior to any interruptions on the ignition powerline resulting from the turning off of the vehicle's ignition. Because the storing procedure eliminates the need for a connection to the vehicle's battery power supply line, a connection to this line may be eliminated and the cost of manufacturing the electronic system may be significantly reduced as well as the labor and time required to install a connection to the battery power supply line when the electronic system is located in an overhead console of the vehicle. Also, in the event the electronic system should get locked in a failure mode, the electronic system will be turned off with the vehicle when the power on the ignition powerline is shut off, thereby preventing excessive current drain on the vehicle's battery.

By providing a connection to the vehicle bus 50, the electronic system is supplied with data from various engine components and other vehicle sensors such as a speed sensor 52, a fuel level sensor 54, and the like, connected to vehicle bus 50. For example, the electronic system may receive odometer data, fuel level data, fuel used data, and vehicle speed data. Such data may be used by microcontroller 15 to compute and display various trip information including distance to empty, fuel economy, average fuel economy, exterior temperature (compensated for vehicle speed), and vehicle heading. By manipulation of various switches connected to switch interface 40, a user may cause microcontroller 15 to change display modes so as to step through the above-mentioned trip information as selected by the user.

As described below, microcontroller 15 performs an interrupt routine at periodic intervals to increment the elapsed time counter. Also, during this interrupt routine, microcontroller 15 may monitor the data supplied on vehicle bus 50 and determine whether any of the user-actuated switches connected to switch interface 40 have been actuated. An example of one such interrupt routine is described below with reference to FIGS. 2A–2C. In a preferred embodiment, this interrupt routine is performed by microcontroller 15 every 0.25 seconds. In order to allow for the elimination of the battery powerline connection to the accessory, the present invention stores data to the non-volatile memory in response to the detection of particular events that occur when a change of data has likely occurred and just prior to any likely interruption of power on the ignition powerline. To allow for more frequent storing of data in the non-volatile memory, the present invention takes advantage of recent advances in fabrication technology of non-volatile memories that have made it possible to make anywhere between 500,000 to 1,000,000 data stores into a non-volatile memory over its lifetime.

Figure 2A:
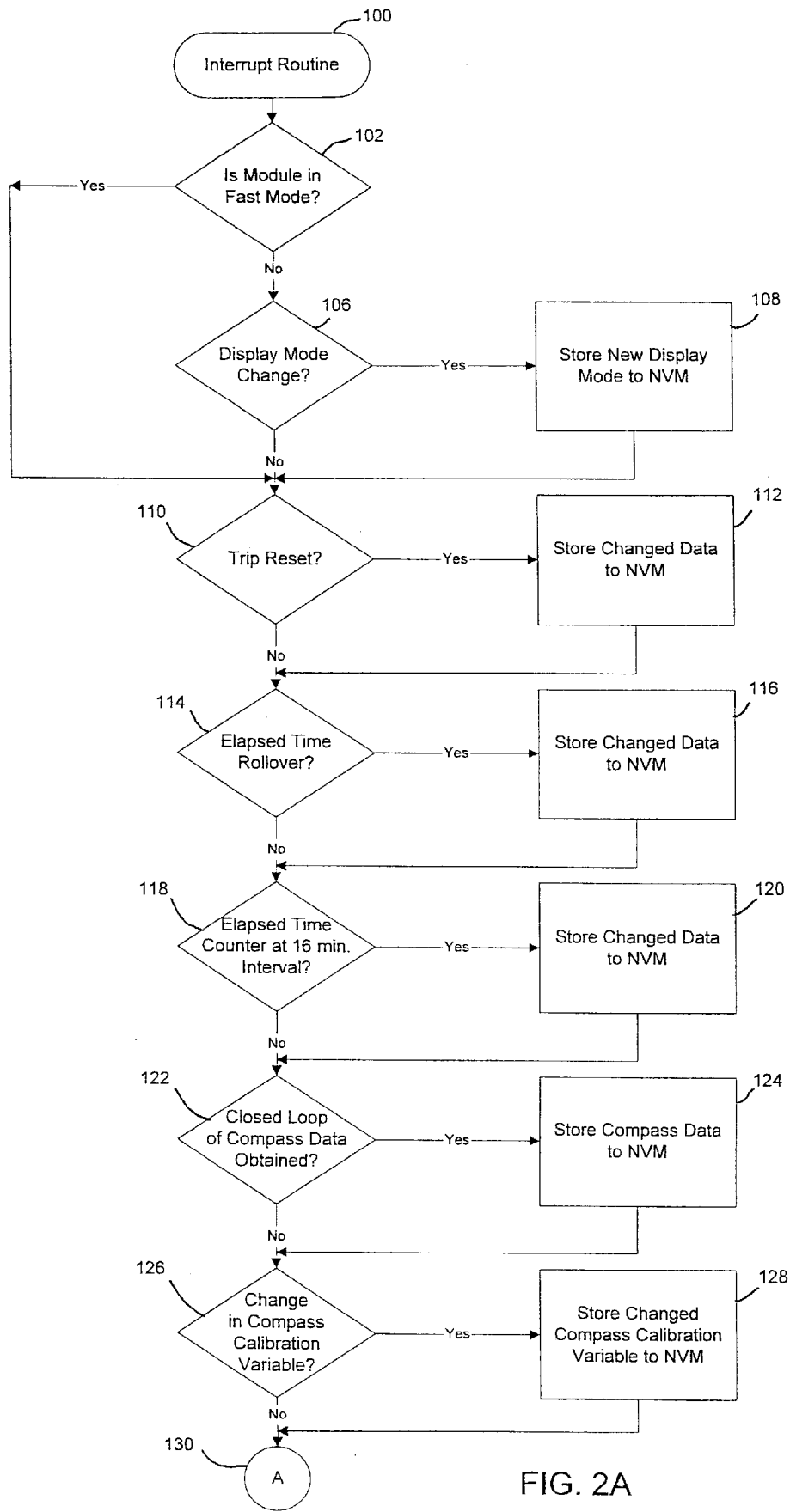
FIGS. 2A–2C are flow diagrams for the microcontroller program implementing the non-volatile memory storage procedure used by the non-volatile memory system of the present invention.
Figure 2B:
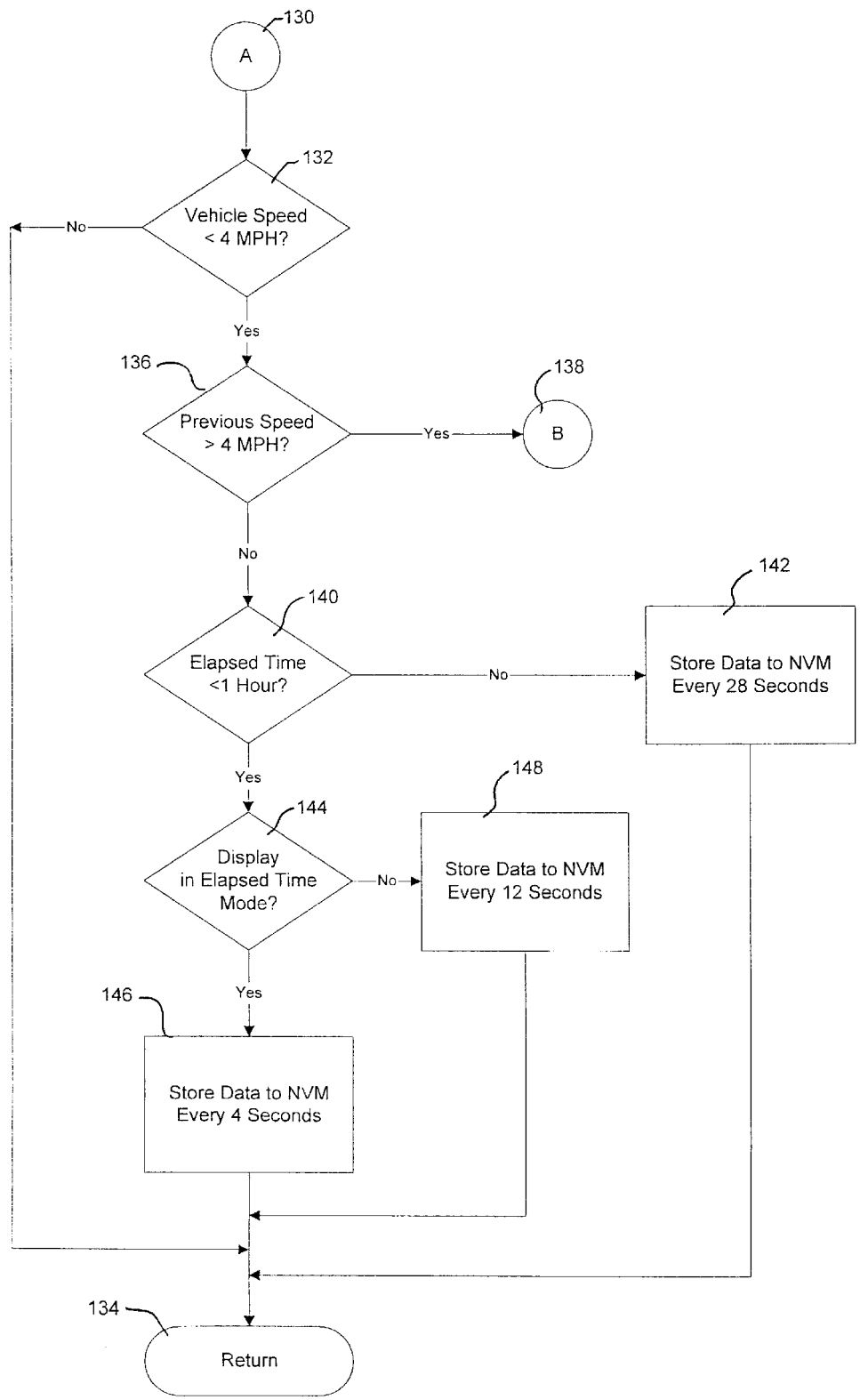
Figure 2C:
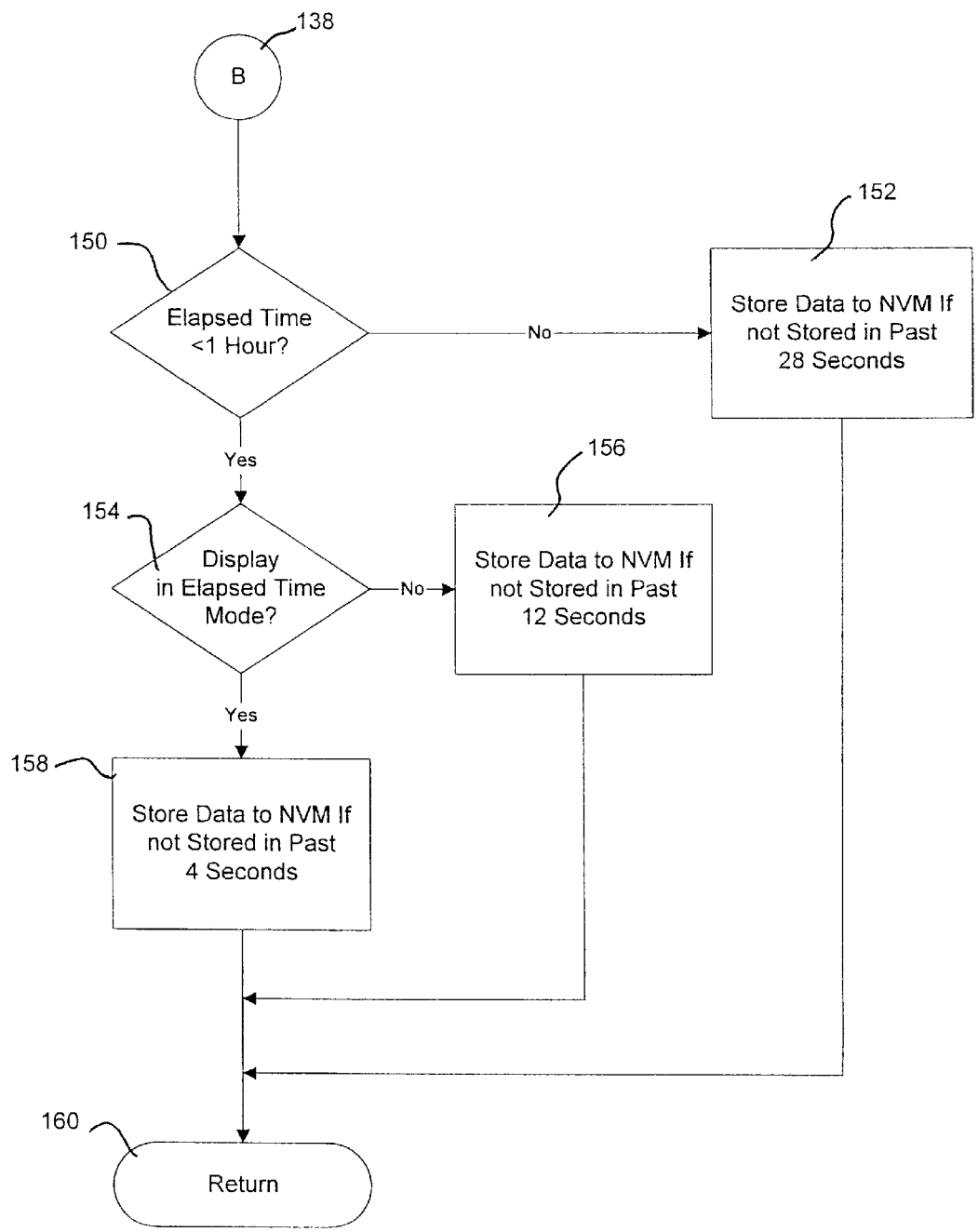

A first portion of the interrupt routine is shown in FIG. 2A. In this first portion, microcontroller 15 monitors various events that may warrant storing data to non-volatile memory 20. Also, microcontroller 15 monitors a counter, such as an elapsed time trip counter, in order to store data to non-volatile memory at periodic intervals during vehicle operation.

As shown in FIG. 2A, the interrupt routine begins by determining whether microcontroller 15 is in a fast mode (step 102). A fast mode exists when a user is rapidly actuating a display mode switch to quickly step through the available display modes. Microcontroller 15 determines whether it is in a fast mode by checking whether the display mode is different in each execution of the interrupt routine. Microcontroller 15 will determine that it is no longer in the fast mode when the selected display mode remains the same for two or more consecutive executions of the interrupt routine. If microcontroller 15 is not in a fast mode, microcontroller 15 determines in step 106 whether the display mode has been changed by the manipulation of one of the user-actuated switches. If microcontroller 15 determines that a display mode has changed, it stores the new display mode to non-volatile memory 20 in step 108 prior to proceeding to step 110. If the display mode is not changed, microcontroller 15 proceeds to step 110 without storing data to the non-volatile memory. If, in step 102, microcontroller 15 determines that it is in a fast mode, it skips step 106 and advances directly to step 110.

In step 110, microcontroller 15 determines whether the user has actuated a trip reset. If a trip reset has not been detected in step 110, microcontroller 15 proceeds to step 114. If a trip reset has been actuated, microcontroller 15 stores the changes in the effected data to non-volatile memory 20 in step 112 prior to proceeding to step 114. In step 114, microcontroller 15 determines whether the elapsed time counter has rolled over. If the elapsed time has rolled over, microcontroller 15 stores any changed data to non-volatile memory 20 prior to proceeding to step 118. If the elapsed time has not rolled over, microcontroller 15 then determines in step 118 whether the elapsed time counter is at a sixteen minute interval. If elapsed time counter is at a sixteen minute interval, microcontroller 15 stores any changed data to non-volatile memory 20 in step 120 prior to proceeding to step 122. If the elapsed time counter is not at a sixteen minute interval, microcontroller 15 then determines in step 122 whether a complete loop of compass data has been obtained for calibrating the compass. If, in step 122, microcontroller 15 determines that a loop of compass data has been obtained, it stores any changed compass calibration data in non-volatile memory 20 prior to proceeding to step 126. If a complete loop of compass data has not been obtained, microcontroller 15 advances to step 126 to determine whether there has been a change in any compass calibration variable. If microcontroller 15 determines in step 126 that a compass calibration variable has changed since the last interrupt routine, it stores the changed compass calibration variables in non-volatile memory 20 prior to proceeding to step 132 (FIG. 2B) via connector A 130. If no compass calibration variable has changed, microcontroller 15 proceeds directly to step 132.

It will be appreciated by those skilled in the art that some of the events monitored in the first portion of the interrupt routine may be eliminated and that additional events may be added to ensure that the particular vehicle accessory in which the present invention is implemented has any important variable data stored in non-volatile memory when it changes.

In the remaining portion of the interrupt routine, microcontroller 15 determines whether the data should be stored to non-volatile memory 20 at more frequent periodic intervals than the sixteen minute interval of step 118, and if so, microcontroller 15 determines which of several possible intervals to use for storing the data. This portion of the interrupt routine begins in step 132 with microcontroller 15 monitoring the vehicle bus 50 to determine whether the vehicle speed is less than four miles per hour. If the vehicle speed is not less than four miles per hour, the interrupt routine is terminated as indicated by RETURN block 134. If, on the other hand, the vehicle speed is less than four miles per hour, microcontroller 15 then determines in step 136 whether the speed detected in the previous interrupt routine was greater than four miles per hour. If the vehicle speed was greater then four miles per hour in the last execution of the interrupt routine, microcontroller 15 proceeds to step 150 (FIG. 2C) via connector B 138. If the previous speed was not greater than four miles per hour, microcontroller 15 then determines in step 140 whether the elapsed time counter is set at a time less than one hour. If the elapsed time is one hour or more, microcontroller 15 sets a flag that will cause data to be stored to non-volatile memory 20 every twenty-eight seconds (step 142), which would, for example, occur every 112th time the interrupt routine is executed. If the elapsed time is less than one hour, microcontroller 15 then determines in step 144 whether the display is in an elapsed time mode (e.g., whether the display is currently displaying the elapsed trip time). If the display is not in the elapsed time mode, microcontroller 15 sets a flag to store data to non-volatile memory every twelve seconds in step 148. If the display is in the elapsed time mode, microcontroller 15 sets a flag to store data to non-volatile memory 20 every four seconds.

By storing the data at more frequent periodic intervals when the vehicle is travelling less than a predetermined speed such as four miles per hour, the memory system of the present invention can ensure that any changes in the data are stored in their present condition just prior to the interruption of power on the vehicle's ignition powerline without storing data so often that the life of the non-volatile memory is prematurely exhausted. By determining whether the elapsed time counter is greater or less than one hour, microcontroller 15 stores data at shorter or longer intervals since the elapsed time counter displays minutes and seconds elapsed when the counter is less than one hour and displays only hours and minutes when the counter is greater than one hour. Thus, elapsed time data changes more frequently when under one hour. The present invention checks the display mode because an elapsed time display mode changes every second when the elapsed time is less than one hour, and therefore, the data needs to be stored at shorter intervals when the display is in the elapsed time mode.

As stated above, if the vehicle speed is detected as being below four miles per hour in this particular execution of the interrupt routine, while having a previously detected speed of more than four miles per hour, microcontroller 15 advances to step 150 (FIG. 2C) where it determines whether the elapsed time is less than one hour. If the elapsed time is not less than one hour, microcontroller 15 stores data to non-volatile memory 20 if data had not been stored in the past twenty-eight seconds (step 152). If the elapsed time is less than one hour, microcontroller 15 determines whether the display is in an elapsed time mode (step 154). If the display is not in the elapsed time mode, microcontroller 15 will store data to non-volatile memory 20 if data had not been stored in the past twelve seconds (step 156). If the display is in an elapsed time mode, microcontroller 15 stores data to the non-volatile memory 20 if data had not been stored in the past four seconds (step 158). Thus, as can be seen from a comparison of FIGS. 2B and 2C, the procedure differs when the previous speed had been detected as greater than four miles per hour in that the data is immediately stored if a store had not been made within the predetermined interval since a vehicle speed greater than four miles per hour would have caused the interrupt routine to set a sixteen minute periodic interval at which to store data to non-volatile memory 20.

Figure 3:
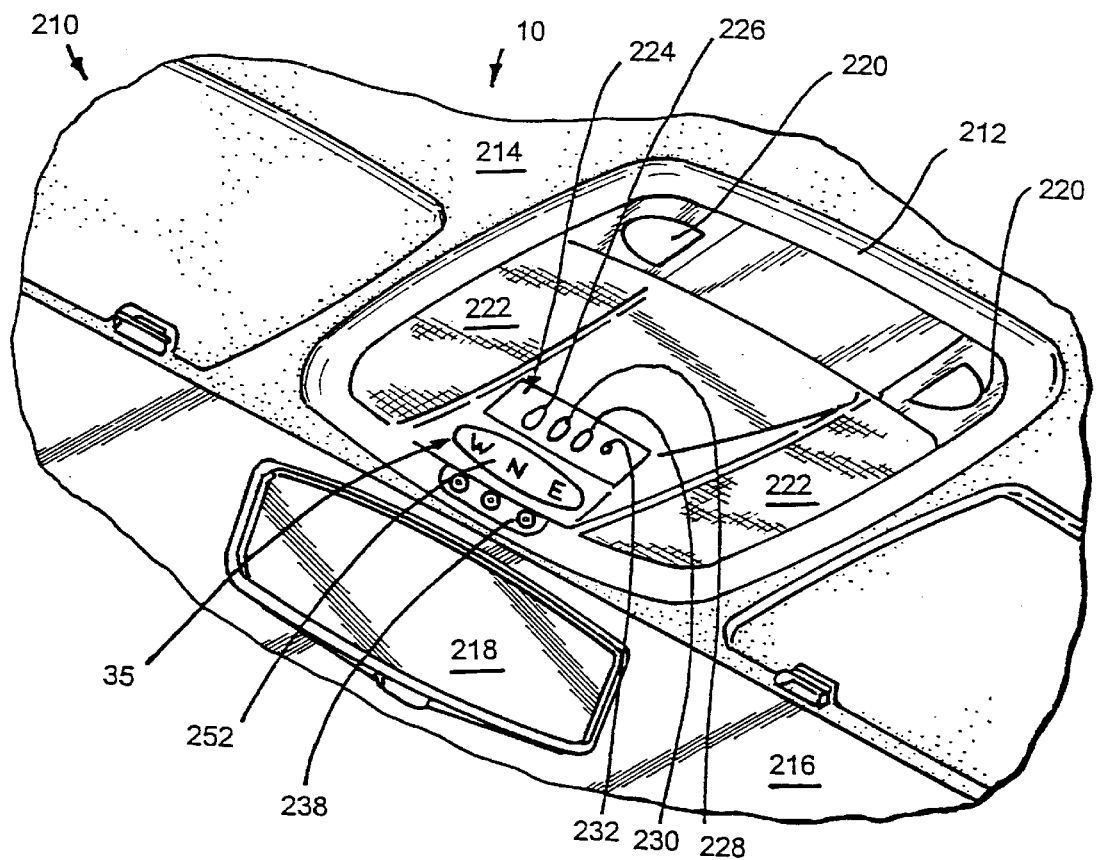
FIG. 3 is a fragmentary perspective view of a vehicle and an overhead console in which the circuit of the present invention may be housed.

In FIG. 3, there is shown a vehicle such as an automobile, which includes an overhead console 212 mounted to the roof 214 of the vehicle during manufacture, although it could be separately added at a later time. Console 212 is centered near the top edge of windshield 216 typically above the rearview mirror 218 and includes a pair of switches 220 for operating lamps positioned behind lenses 222 which in turn direct illumination into the lap area of either the driver or passenger side of the vehicle depending on which switch is actuated. The center of the console may include a trainable garage door opening transmitter 224 of the type disclosed in U.S. Pat. No. 5,442,340. This trainable transmitter can learn the RF frequency, modulation scheme, and security code for three or more existing remote transmitters. Thus, console 212 including trainable transmitter 224, can replace at least three separate remote control transmitters usually loosely stored in the vehicle. The transmitter includes three control switches 226, 228, and 230 and an indicator LED 232 for the display of training, prompting, and operating information to the vehicle operator. Console 212 also includes the digital display 35 providing, in one embodiment of the invention, a sixteen point compass display of the vehicle heading, and other trip information provided from microcontroller 15 and other components shown in FIG. 1 housed in console 212. Console 212 also includes display control buttons 238 included within switch interface 40 (FIG. 1) for selecting information to be displayed by stepping through various display modes. Although the present invention is described as being incorporated within an overhead housing, it could also be housed in other vehicle accessories such as a sun visor, rearview mirror, A-pillar, instrument panel, or any other suitable location within the vehicle.

It will be appreciated by those skilled in the art that the present invention may be embodied in systems having a different construction than that shown in FIG. 1. For example, non-volatile memory 20 could be coupled to microcontroller 15 through vehicle bus 50 to allow the location of non-volatile memory 20 at a different location in the vehicle. In this case, microcontroller 15 could still perform the interrupt routine 100 shown in FIGS. 2A–2C while sending instructions over vehicle bus 50 along with any changed data to have such data stored in non-volatile memory 20. Similarly, the interrupt routine could be performed by a second microcontroller connected to vehicle bus 50 which would send requests over vehicle bus 50 to microcontroller 15 to supply any changed data for storage in non-volatile memory 20.

It will be also apparent to those skilled in the art that different vehicle speeds could be used to trigger the saving of data to a non-volatile memory. Also, different data storage time intervals may be used without departing from the spirit and scope of the present invention.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law.

The embodiments of the invention in which an exclusive property or privilege is claimed are defined as follows:

1. An electronic accessory for a vehicle comprising:
    a non-volatile memory; and
    a controller coupled to said non-volatile memory and to a speed sensor of the vehicle for receiving speed data representing the vehicle's current speed, wherein said controller determines when the vehicle's current speed falls below a predetermined threshold and stores variable data in said non-volatile memory when the vehicle's speed is below said predetermined threshold.

2. An electronic accessory for a vehicle comprising:
    a non-volatile memory;
    a controller coupled to said non-volatile memory and to a speed sensor of the vehicle for receiving speed data representing the vehicle's current speed, wherein said controller determines when the vehicle's current speed falls below a predetermined threshold and stores variable data in said non-volatile memory when the vehicle's speed is below said predetermined threshold; and
    a power supply module coupled to an ignition power supply line of the vehicle for supplying power to said controller and said non-volatile memory when the vehicle's ignition is on.

3. The electronic vehicle accessory as defined in claim 1, wherein said controller stores said variable data in said non-volatile memory at periodic intervals when the vehicle's speed is below said predetermined threshold.

4. The electronic vehicle accessory as defined in claim 1 and further including a display coupled to said controller for displaying trip information supplied from said controller, wherein said controller generates said trip information including an elapsed trip time and stores variable data in said non-volatile memory at a first periodic interval when the vehicle's speed is below said predetermined threshold and said elapsed trip time is an hour or more and stores variable data in said non-volatile memory at a second periodic interval when the vehicle's speed is below said predetermined threshold and said elapsed trip time is less than an hour.

5. The electronic vehicle accessory as defined in claim 4, wherein said first periodic interval defines a lower frequency storage rate than said second periodic interval.

6. The electronic vehicle accessory as defined in claim 4 and further including:
    a user actuated switch coupled to said controller for changing a display mode of said display when actuated, wherein, in one of said display modes, said controller supplies elapsed trip time to said display for display to the user, when said elapsed trip time is less than one hour, said controller stores variable data in said non-volatile memory at said second periodic interval unless said controller is in a display mode in which said display is displaying the elapsed trip time in which event, said controller stores variable data in said non-volatile memory at a third periodic interval.

7. The electronic vehicle accessory as defined in claim 6, wherein said first periodic interval defines a lower frequency storage rate than said second periodic interval, and said second periodic interval defines a lower frequency storage rate than said third periodic interval.

8. The electronic vehicle accessory as defined in claim 1, wherein said controller is coupled to said speed sensor through a vehicle bus.

9. The electronic vehicle accessory as defined in claim 1 and further including:
    a display coupled to said controller for displaying information supplied by said controller; and
    an overhead console adapted to be mounted a vehicle for housing at least said controller and said display.

10. The electronic vehicle accessory as defined in claim 9, wherein said overhead console further houses a trainable transmitter for learning the characteristics of a received RF activation signal and for transmitting a modulated RF signal having the learned characteristics.

11. The electronic vehicle accessory as defined in claim 1 and further including:
    a compass sensor coupled to said controller for supplying vehicle heading information; and
    a display coupled to said controller for displaying vehicle heading information received from said controller.

12. The electronic vehicle accessory as defined in claim 11, wherein said variable data stored in said non-volatile memory by said controller includes compass calibration variables.

13. The electronic vehicle accessory as defined in claim 12, wherein said controller stores the compass calibration variables in said non-volatile memory whenever said controller determines that the compass calibration variables have changed.

14. The electronic vehicle accessory as defined in claim 1 wherein said electronic vehicle accessory is an on-board trip computer further including:
    a display coupled to said controller for displaying information received from said controller; and
    a user actuated switch coupled to said controller for changing display modes, wherein said controller is coupled to a vehicle bus for receiving vehicle data including at least data representing current vehicle speed and distance travelled, and said controller generates trip information from the received data for display in response to selected display modes.

15. An electronic compass for a vehicle comprising:
    a non-volatile memory;
    a compass sensor for sensing a vehicle heading;
    a controller coupled to said compass sensor, to said non-volatile memory, and to a speed sensor of the vehicle for receiving speed data representing the vehicle's current speed, said controller generates vehicle heading information from heading data supplied from said compass sensor, said controller determines when the vehicle's current speed falls below a predetermined threshold and stores variable compass data in said non-volatile memory when the vehicle's speed is below said predetermined threshold; and a display coupled to said controller for displaying the vehicle heading supplied thereto by said controller.

16. The electronic vehicle compass as defined in claim 15, wherein the variable compass data stored in said non-volatile memory includes compass calibration variables and a vehicle heading.

17. The electronic vehicle compass as defined in claim 16, wherein said controller stores the compass calibration variables in said non-volatile memory whenever said controller determines that the compass calibration variables have changed.

18. The electronic vehicle compass as defined in claim 16, wherein said controller generates and stores compass calibration variables in said non-volatile memory each time said controller determines that the vehicle has travelled in a closed loop.

19. The electronic vehicle compass as defined in claim 15 and further including an overhead console adapted to be mounted a vehicle for housing at least said controller and said display.

20. The electronic vehicle compass as defined in claim 19, wherein said overhead console further houses a trainable transmitter for learning the characteristics of a received RF activation signal and for transmitting a modulated RF signal having the learned characteristics.

21. The electronic vehicle compass as defined in claim 15 and further including a temperature sensor coupled to said controller for sensing exterior temperature and supplying temperature data to said controller, wherein said controller controls said display to display the sensed external temperature with the vehicle heading information.

22. An on-board trip computer for a vehicle comprising:
a non-volatile memory;
a vehicle bus interface coupled to a vehicle bus providing vehicle data including data representing current vehicle speed and distance travelled;
a controller coupled to said non-volatile memory and to said vehicle bus interface for receiving vehicle data and generating trip information from the received vehicle data, said controller determines when the vehicle's current speed falls below a predetermined threshold and stores vehicle data in said non-volatile memory when the vehicle's speed is below said predetermined threshold; and
a display coupled to said controller for displaying trip information received from said controller.

23. The on-board trip computer as defined in claim 22, wherein the vehicle data received from the vehicle bus further includes current fuel level and fuel consumption information, and the trip information generated by said controller includes current fuel economy, average fuel economy for a trip, elapsed trip time, trip distance travelled, and distance until empty information.

24. The on-board trip computer as defined in claim 22 and further including a user actuated switch coupled to said controller for selecting display modes, wherein said controller generates different trip information for display in response to the selected display modes.

25. The on-board trip computer as defined in claim 24, wherein said controller stores variable data in said non-volatile memory whenever the selected display mode is changed.

26. The on-board trip computer as defined in claim 22 and further including an overhead console adapted to be mounted a vehicle for housing at least said controller and said display.

27. The on-board trip computer as defined in claim 26, wherein said overhead console further houses a trainable transmitter for learning the characteristics of a received RF activation signal and for transmitting a modulated RF signal having the learned characteristics.

28. The on-board trip computer as defined in claim 22 and further including a compass sensor coupled to said controller for supplying vehicle heading information for display on said display.

29. The on-board trip computer as defined in claim 22 and further including a temperature sensor coupled to said controller for sensing exterior temperature and supplying temperature data to said controller for display on said display.

30. A method for storing variable data in a non-volatile memory used in a vehicle, the method comprising the steps of:
sensing the speed of the vehicle;
comparing the sensed vehicle speed with a predetermined threshold; and
storing variable data in the non-volatile memory when the sensed var below said predetermined threshold.

31. The method as defined in claim 30, wherein the step of storing variable data in the non-volatile memory includes the step of storing variable data in the non-volatile memory at periodic intervals when the sensed vehicle speed is below said predetermined threshold.

32. The method as defined in claim 30 and further including the step of providing an elapsed trip time counter in the vehicle for generating elapsed trip time information.

33. The method as defined in claim 32 and further including the steps of:
selecting a first period interval when the elapsed time is more than one hour;
selecting a second periodic interval of shorter duration than the first periodic interval when the elapsed time is less than one hour; and
storing variable data in the non-volatile memory at the selected periodic interval when the sensed variable speed is below said predetermined threshold.

34. The method as defined in claim 32 and further including the steps of:
providing a display in the vehicle for displaying information to vehicle occupants;
determining whether that the display is in an elapsed time mode when the display is currently displaying the elapsed trip time;
selecting a first period interval when the elapsed time is more than one hour;
selecting a second periodic interval of shorter duration than the first periodic interval when the elapsed time is less than one hour and the display is not in the elapsed time mode;
selecting a third periodic interval of shorter duration than the first and second periodic intervals when the elapsed time is less than one hour and the display is in the elapsed time mode; and
storing variable data in the non-volatile memory at the selected periodic interval when the sensed variable speed is below said predetermined threshold.

35. The method as defined in claim 32 and further including the step of storing variable data in the non-volatile memory whenever said elapsed trip time counter rolls over.

36. The method as defined in claim 30 and further including the step of storing variable data in the non-volatile memory whenever changes in selected parameters represented by the variable data are detected.

37. The method as defined in claim 30 and further including the steps of:

providing a display in the vehicle for displaying information to vehicle occupants;

providing a user actuated switch for enabling a user to change display modes of said display; and storing variable data in the non-volatile memory whenever the selected display mode is changed.

38. The method as defined in claim 30 and further including the steps of:

storing variable data in the non-volatile memory at a first periodic interval when the vehicle's speed is greater than said predetermined threshold; and storing variable data in the non-volatile memory at a second, more frequent periodic interval when the vehicle's speed is less than said predetermined threshold.

39. The method as defined in claim 30 and further including the steps of:

providing a mini trip computer in the vehicle that is coupled to the non-volatile memory;

providing a user actuated reset switch coupled to said mini trip computer to enable a user to reset variable data accumulated during a trip by said mini trip computer; and storing variable data in the non-volatile memory whenever said reset switch is actuated.

* * * * *

UNITED STATES PATENT AND TRADEMARK OFFICE
CERTIFICATE OF CORRECTION

PATENT NO. : 6,044,315
DATED : March 28, 2000
INVENTOR(S) : Brian S. Honeck et al.

It is certified that error appears in the above-indentified patent and that said Letters Patent is hereby corrected as shown below:

Col. 2, line 57;
    After "of" insert --the--;
Col. 8, line 26;
    After "mounted" insert --to--;
Col. 9, line 25;
    After "mounted" insert --to--;
Col. 10, line 3;
    After "mounted" insert --to--;
Col. 10, line 25;
    "var" should be --vehicle speed--;
Col. 10, line 49;
    After "whether" delete --that--.

Signed and Sealed this

Twentieth Day of March, 2001

*Attest:*

NICHOLAS P. GODICI

*Attesting Officer*       *Acting Director of the United States Patent and Trademark Office*